(12) United States Patent
Ksiezopolski et al.

(10) Patent No.: US 8,408,625 B1
(45) Date of Patent: Apr. 2, 2013

(54) CORNER SEAL

(75) Inventors: Edwin E. Ksiezopolski, Granger, IN (US); Norman L. Newhouse, Mishawaka, IN (US)

(73) Assignee: Lifetime Industries, Inc., Rogers, MN (US)

( * ) Notice: Subject to any disclaimer, the term of this patent is extended or adjusted under 35 U.S.C. 154(b) by 0 days.

(21) Appl. No.: 13/298,964

(22) Filed: Nov. 17, 2011

Related U.S. Application Data

(63) Continuation-in-part of application No. 12/963,851, filed on Dec. 9, 2010, now abandoned.

(51) Int. Cl.
*B60P 3/34* (2006.01)
(52) U.S. Cl. ..................... 296/26.09; 296/171; 296/175; 296/26.13
(58) Field of Classification Search .................. 296/171, 296/175, 26.09, 26.13; 52/67; 277/644, 277/645
See application file for complete search history.

(56) References Cited

U.S. PATENT DOCUMENTS

| 5,226,277 | A | 7/1993 | Beckmann et al. |
| 7,614,676 | B2 | 11/2009 | Ksiezopolski et al. |
| 7,614,677 | B2 | 11/2009 | Ksiezopolski et al. |

*Primary Examiner* — Joseph Pape
(74) *Attorney, Agent, or Firm* — Botkin & Hall, LLP

(57) ABSTRACT

A resilient seal used in an RV having a slide out room defining an interior space. The RV having a first sidewall having an exterior side, the first sidewall defining an opening through which the slide out room is shifted between extended and retracted positions. The slide out room including a second sidewall spaced from the first sidewall and an end wall defining the interior space. The end wall has a peripheral flange that overlaps the first sidewall when the slide out room is in its closed position. The seal of the present invention includes a single piece integrally connected corner piece having substantially perpendicular legs meeting at a fused mitered watertight corner. The corner piece prevents entry of water where seals supporting the corner piece meet particularly when the slide out room is retracted.

7 Claims, 8 Drawing Sheets

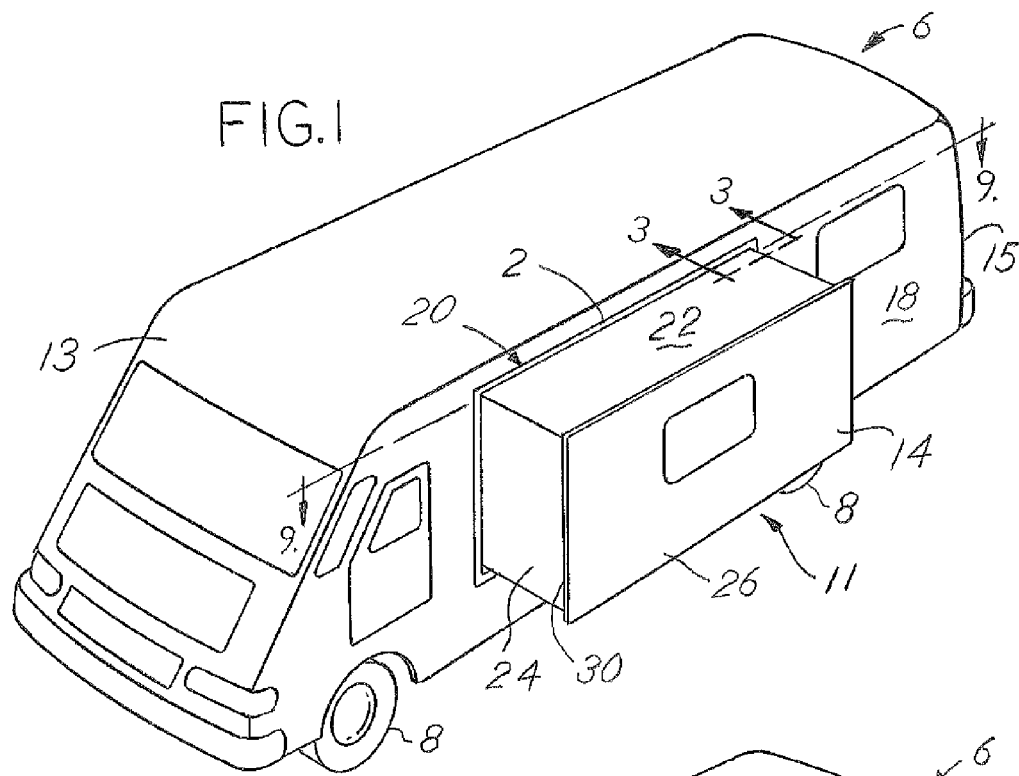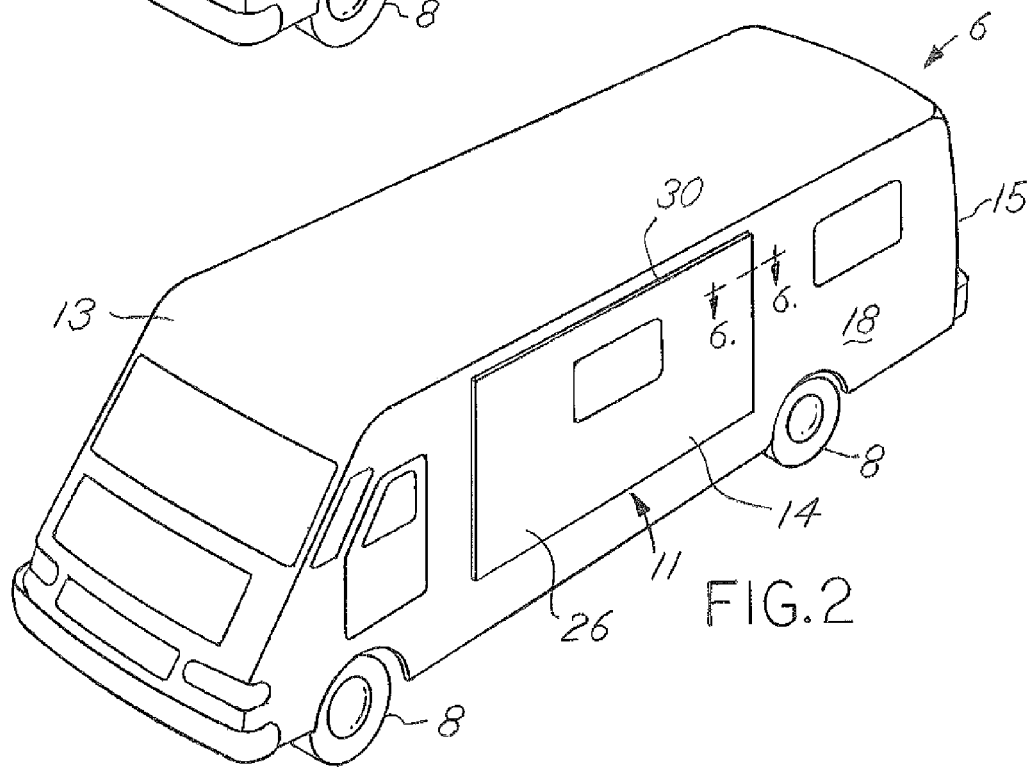

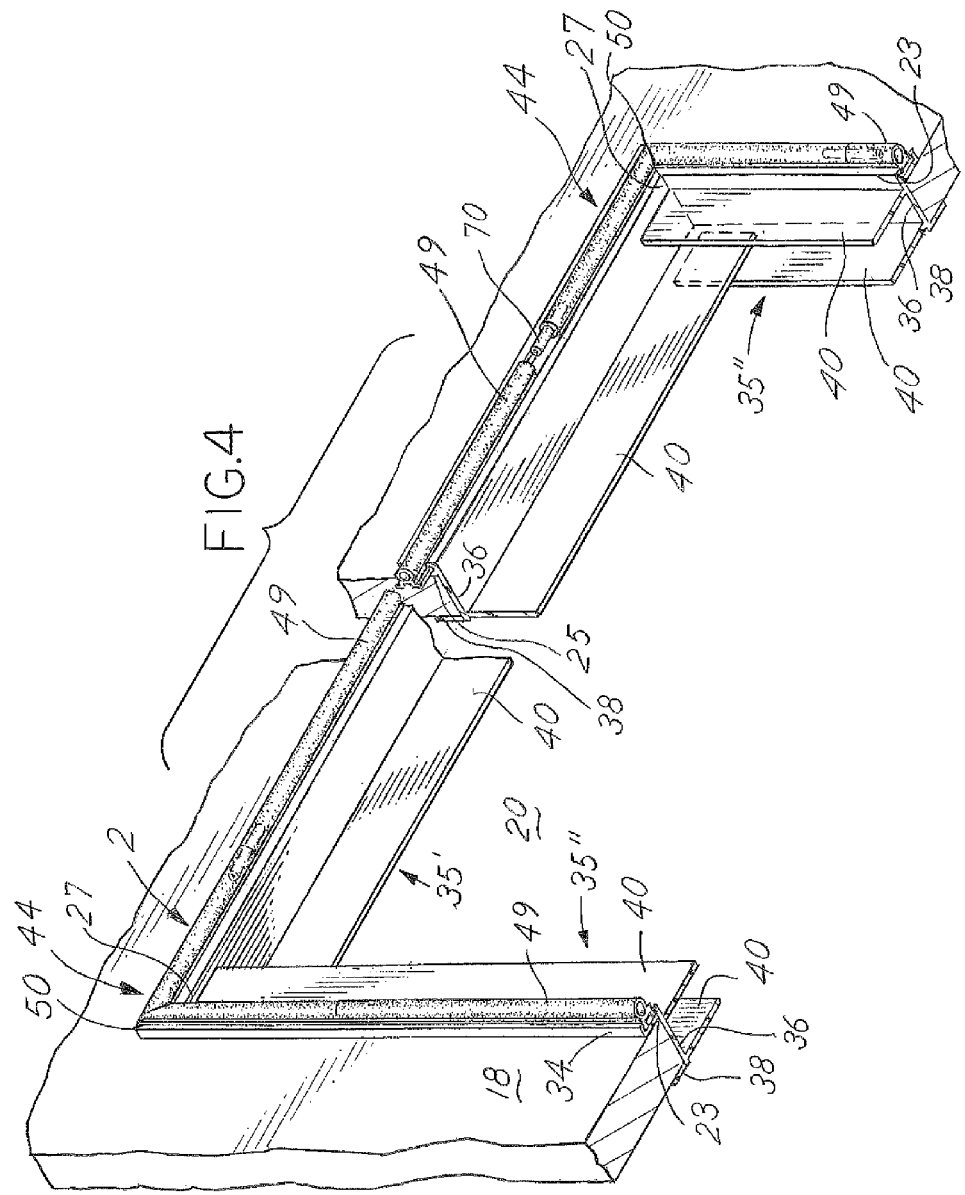

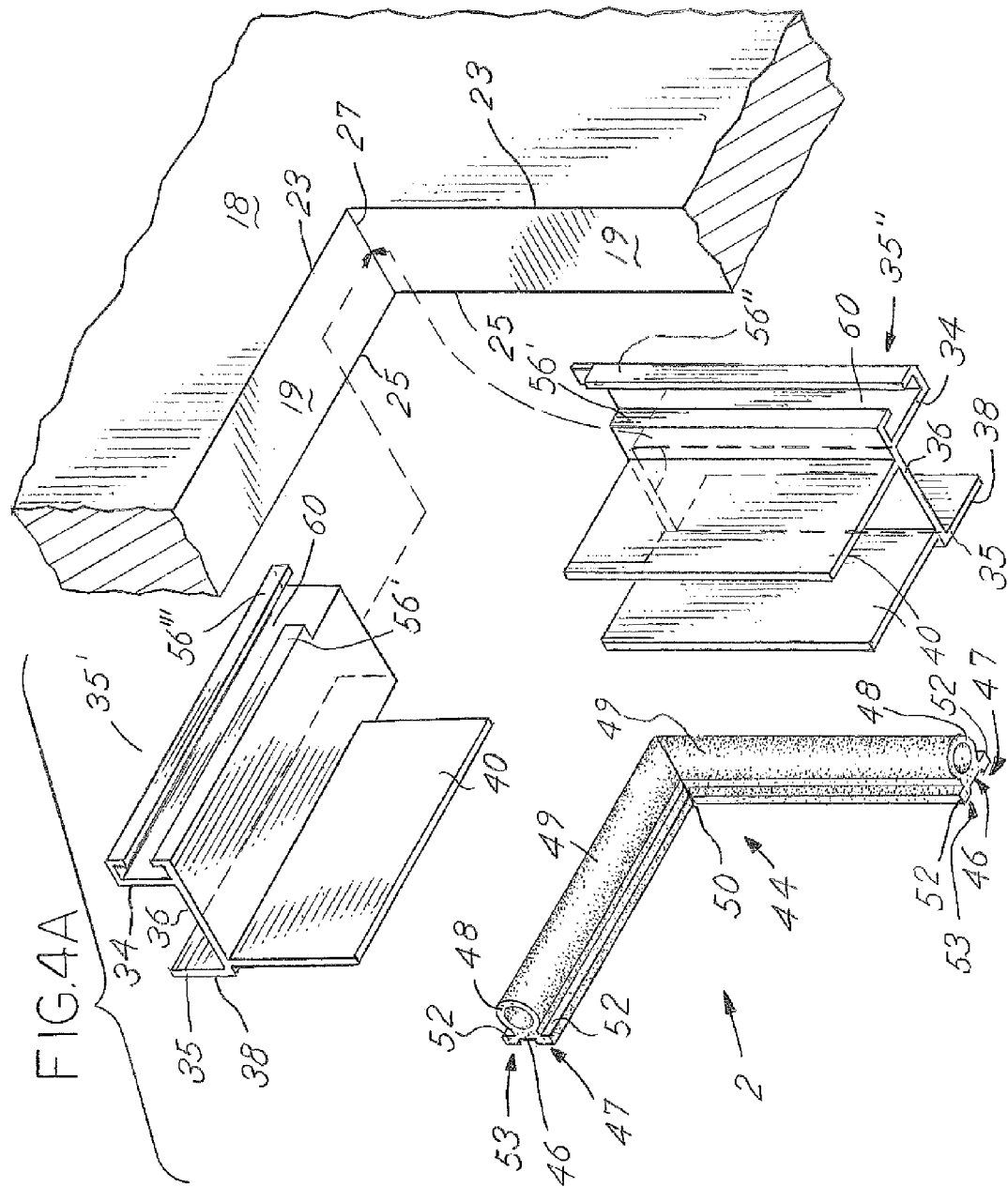

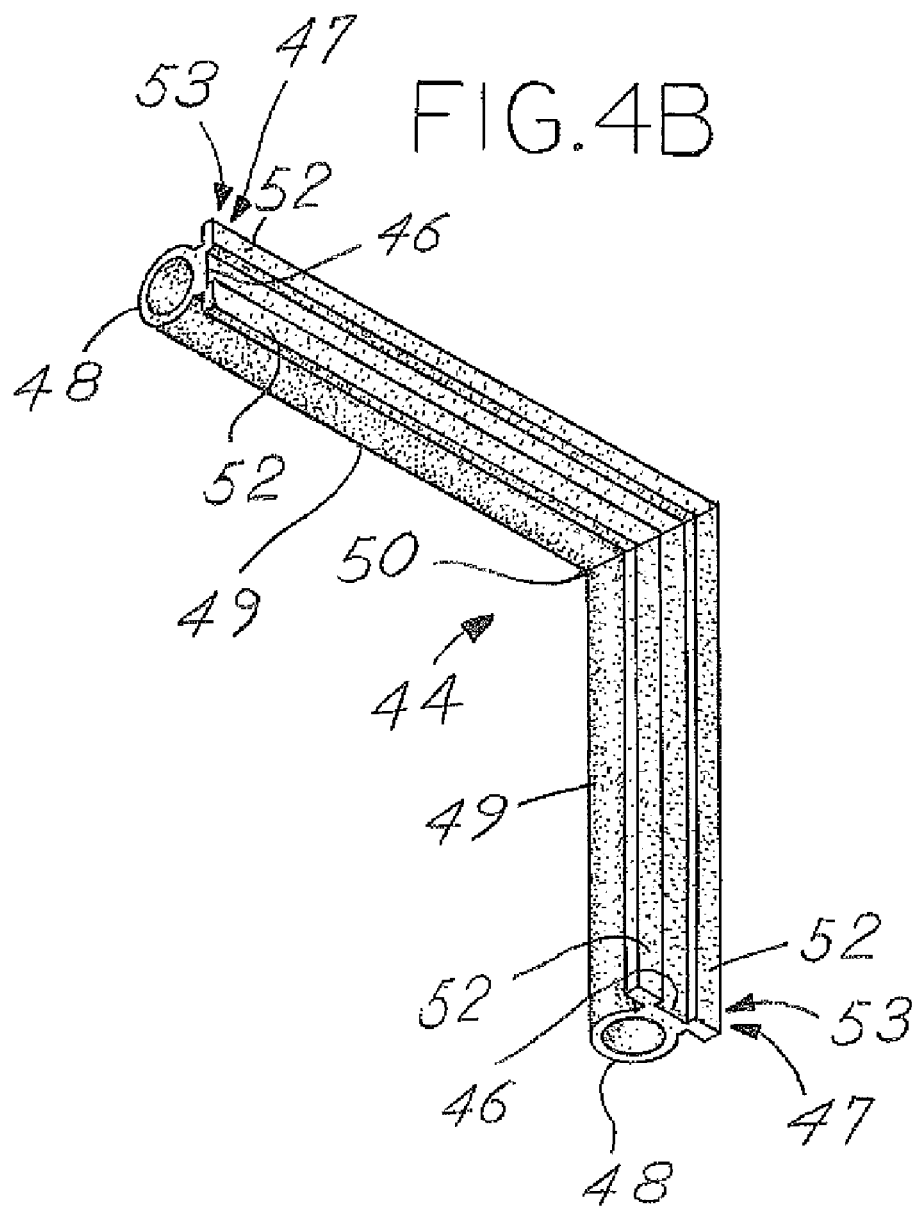

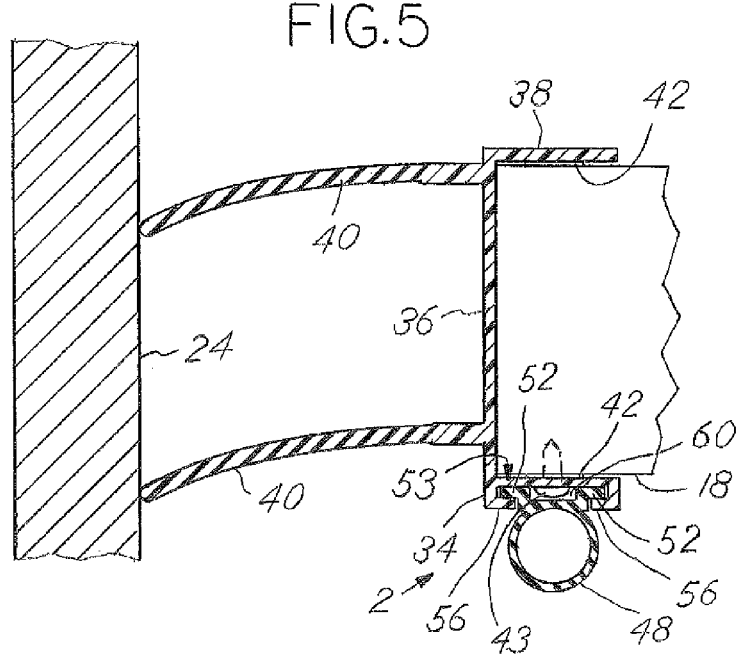
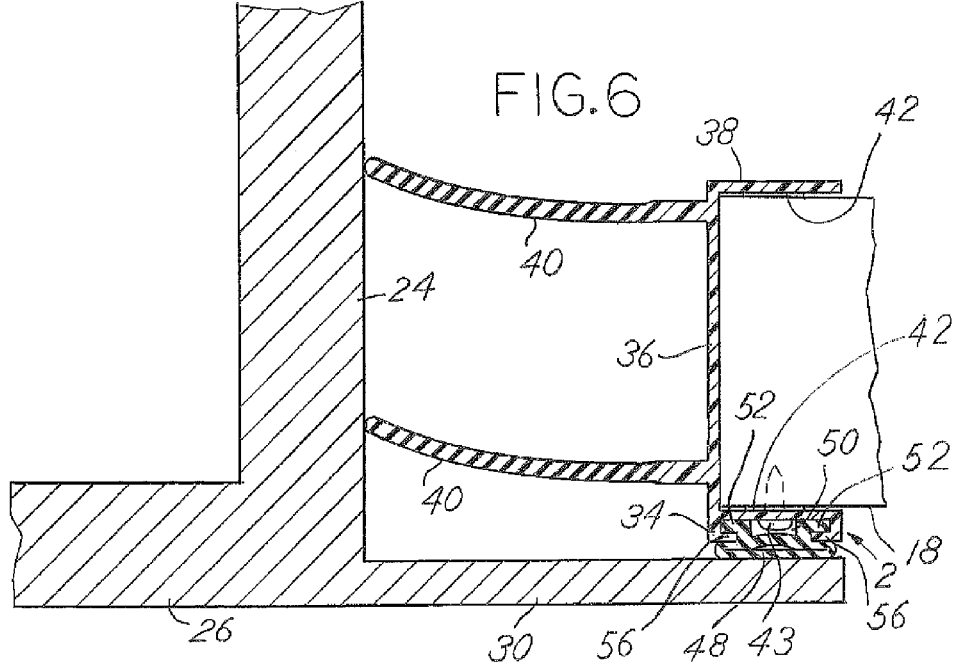

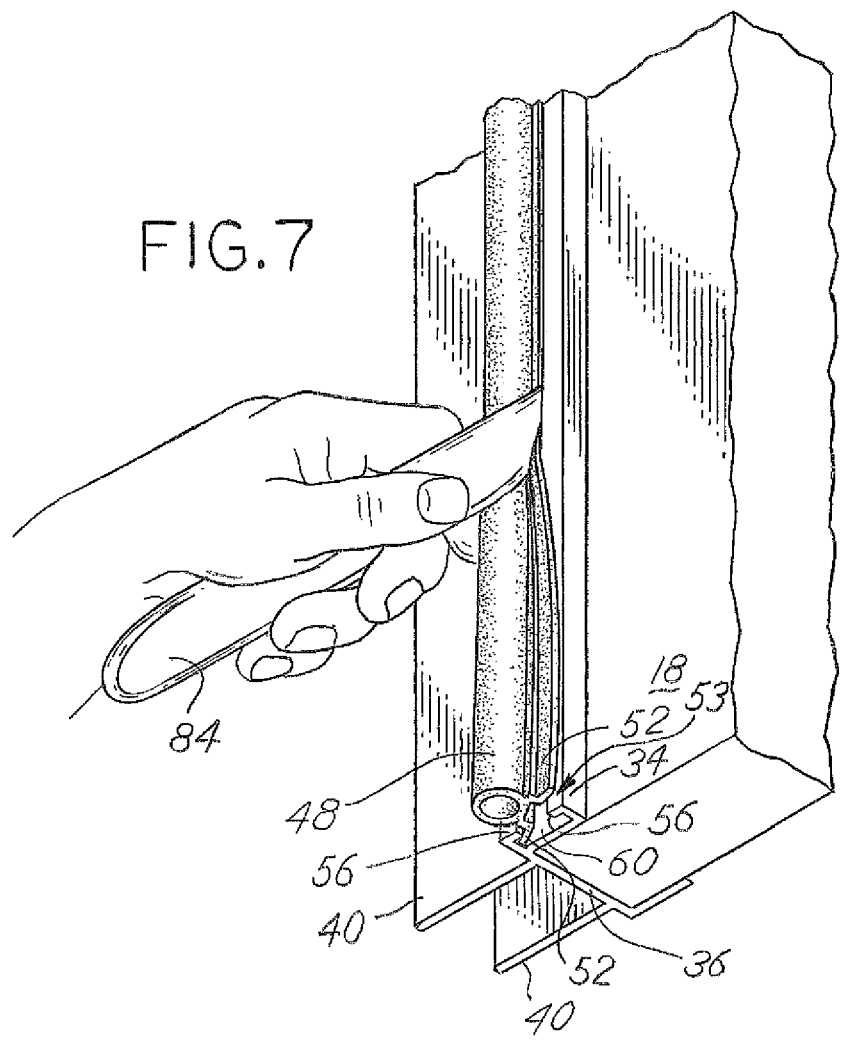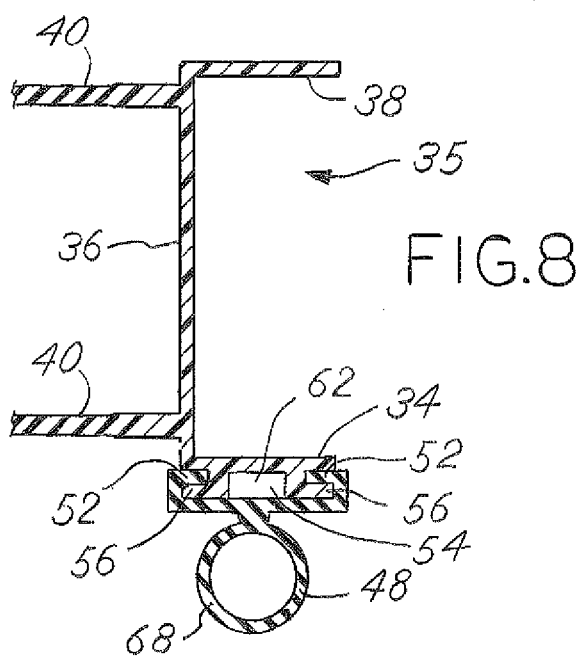

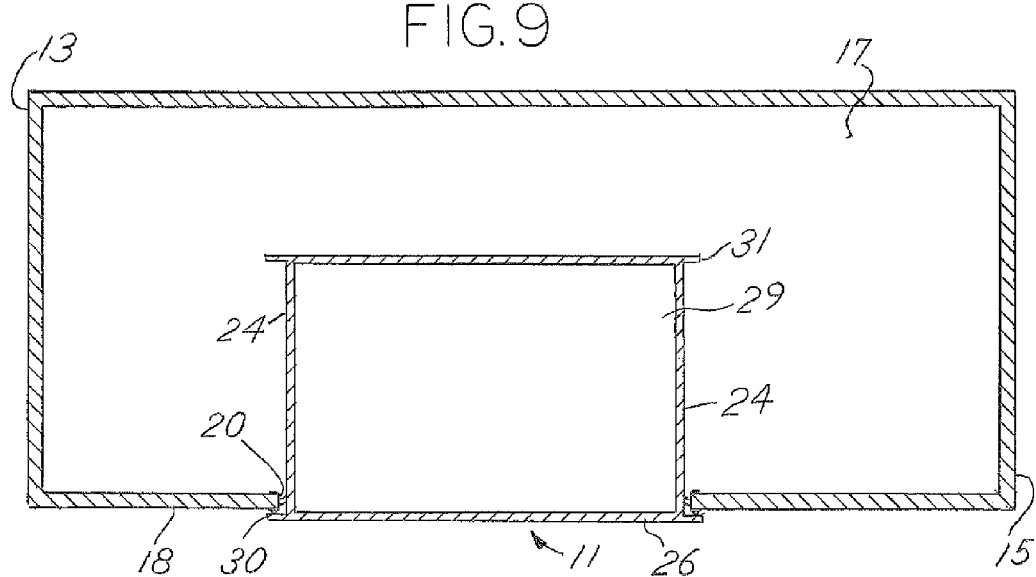
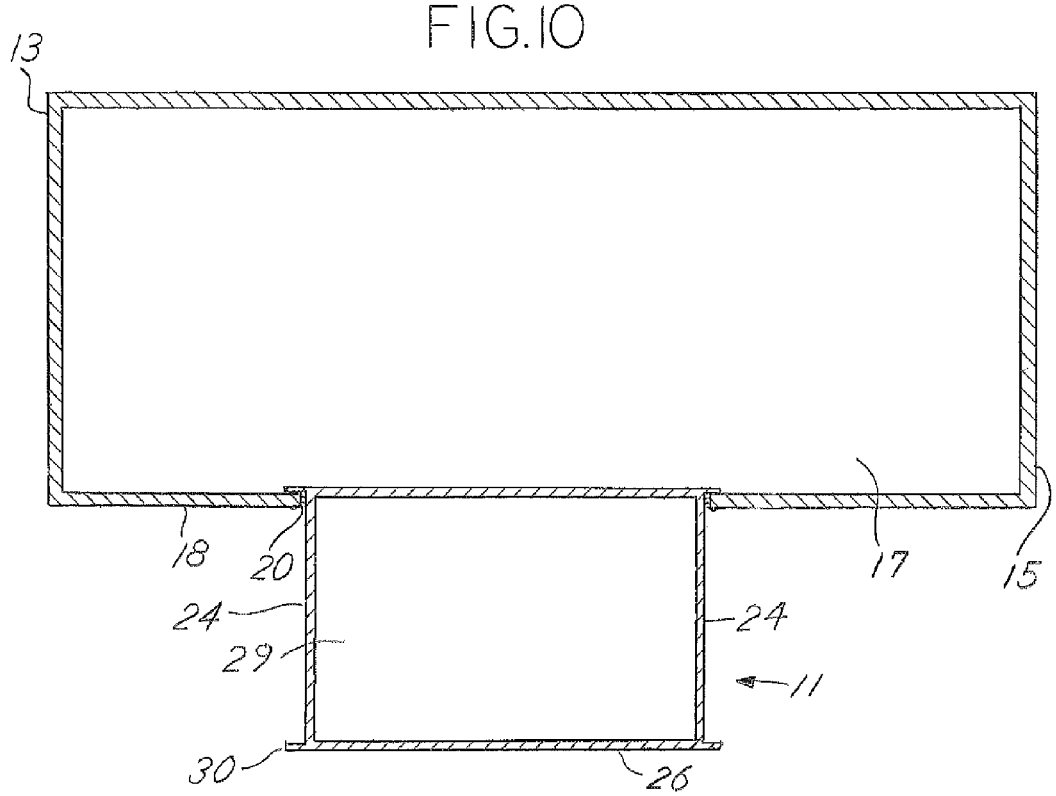

CORNER SEAL

CROSS REFERENCE TO RELATED APPLICATIONS

This application is a continuation-in-part claiming the benefit of U.S. application Ser. No. 12/963,851, filed Dec. 9, 2010, now abandoned the disclosure of which is hereby incorporated by reference.

BACKGROUND OF THE INVENTION

Slide out rooms are a popular solution in the recreational vehicle (RV) industry to add interior space and due to their nature are difficult to seal. A major difficulty in sealing RV slide out rooms arises in the corners. Wiper seals and bulb seals have been used in the past with success to nearly completely seal slide out rooms when retracted and extended. A weakness of present systems is that they often lack ability to seal the corners. This is because traditional extruded seals are cut to length squarely, but the corners are not mitered. This provides a potential for leakage in the corners. Having mitered corners where the seals meet outside of the opening through which the slide out room moves could provide a method for sealing that would prevent water from entering at the corners where seals meet. It is desirable to have a sealing method that provides an outer seal to span an area where square cut seals meet to prevent leakage at corners of the slide out opening.

SUMMARY OF THE INVENTION

A resilient seal used in combination with a RV having a slide out room defining an interior space. The RV has a first sidewall having an exterior side, the first sidewall defines an opening through which the slide out room is shifted between open and closed positions relative to the first sidewall. The slide out room includes a second sidewall spaced from the first sidewall and an end wall defining the interior space. The end wall has a peripheral flange that overlaps the first sidewall when the slide out room is in its closed position. Edge seals that are installed along edges of the opening work with a corner piece. The edge seals have either a tongue or groove.

BRIEF DESCRIPTION OF THE DRAWINGS

FIG. 1 a perspective view of an RV on which the seal is used with its slide out room extended;

FIG. 2 is a perspective view of the RV in FIG. 1 with the slide out room retracted;

FIG. 4 is a perspective view of the seal shown in FIG. 3 shown in conjunction with a straight segment of bulb seal;

FIG. 4A is an exploded perspective view of the seal shown in FIG. 4;

FIG. 4B is a rear view of the corner piece shown in FIG. 4A;

FIG. 5 is a sectional view of the seal shown taken about the line 5-5 in FIG. 3;

FIG. 6 is a sectional view of the seal with the slide out room in a retracted position and taken about the line 6-6 in FIG. 2;

FIG. 7 is a perspective view of a leg of the corner piece having outwardly facing tabs; and FIG. 8 is a sectional view of a leg of the corner piece having inwardly facing tabs;

FIG. 9 is a sectional view of the RV showing the slide out room in its retracted position; and FIG. 10 is a sectional view of the RV showing the slide out room in its extended position.

DETAILED DESCRIPTION OF INVENTION

Figure 3:
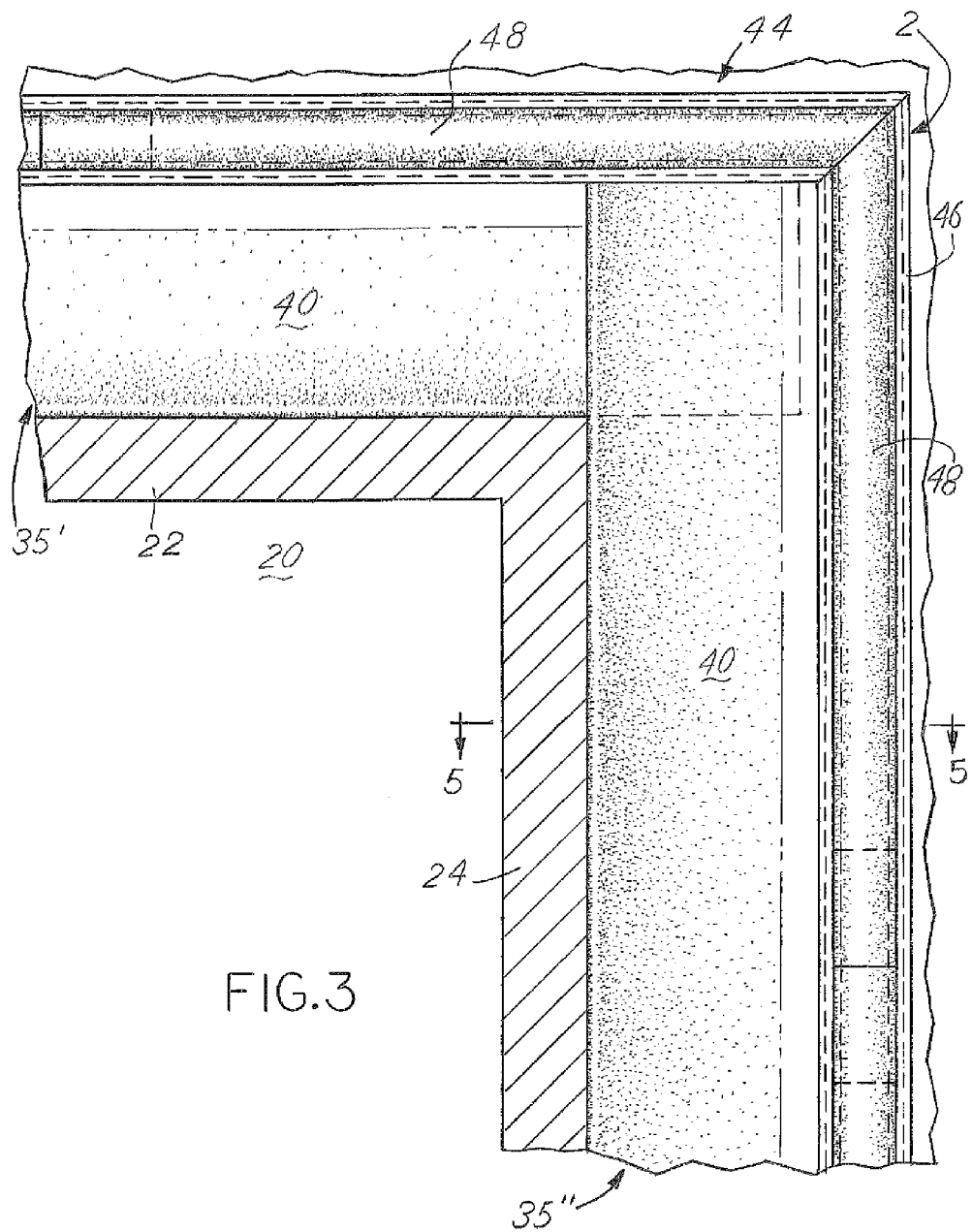
FIG. 3 is a view of the seal as taken from the line 3-3 in FIG. 1.

The seal 2 of this invention is particularly well adapted to be used on a recreational vehicle (RV) 6 having a slide out room 11. The example of an RV 6 shown in FIGS. 1 and 2 is a motor home, but could also be a towable trailer. The RV 6 rides on wheels 8. The RV 6 has a front wall 13 and a back wall 15, opposite sidewalls 18 and roof 16 that cooperate to define a main living area generally indicated by the numeral 17. At least one of the sidewalls 18 has an opening 20 through which a slide out room 11 may be shifted from retracted position shown in FIG. 2 to an extended position shown in FIG. 1. Slide out rooms 11 are well known in the art of RVs 6 for adding interior space to the RV 6. The slide out room 11 has a ceiling wall 22 and second sidewalls 24 that join an end wall 26. The ceiling wall 22, second sidewalls 24, and end wall 26 cooperate to define an auxiliary living area generally indicated at 29. The end wall 26 is wider than the distance between the second side walls 24 of the slide out room 11 and the end wall 26 extends above and below the slide out room 11. As such, the end wall 26 has an outer peripheral flange 30 extending around the perimeter of the slide out room 11. The flange 30 overlaps the first sidewall 18 when the slide out room 11 is in its retracted position. FIGS. 6 and 9 show a sectional view that illustrates the overlapping relationship of the peripheral flange 30 with the first sidewall 18. An inner peripheral flange 31 extends from sidewalls 24 and ceiling wall 22 in an overlapping relationship with sidewall 18 when the slide out room 11 is retracted. This overlapping relationship is shown in FIG. 9.

As known to those skilled in the art, the slide out room 11 is shiftable from the retracted position shown in FIG. 2 to the extended position shown in FIG. 1 to expand the living area within the RV 6 when the room is extended. A top sectional view of the slide out room 11 in its retracted position is shown in FIG. 9 and a top sectional view of the slide out room 11 in its extended position is shown in FIG. 10.

The seal 2 is located along the periphery of the opening 20 to prevent dirt, water, and other materials from passing from the exterior to the interior of the RV 6. This is of particular importance when the room 11 is in its retracted position because the seal 2 must be able to stand the elements when the RV is being driven at highway speeds. The opening in the sidewall 18 has outer edges 23 on the outer side of the sidewall 18 and inner edges 25 on the inner side of the sidewall 18. The outer and inner edges 23, 25 define the perimeter of the rectangular opening 20. Located between the edges 23, 25 is a transverse surface 19 that spans between the edges 23, 25 and is of a width equal to the thickness of the sidewall 18. The transverse surfaces 19 meet to form corners 27.

The seal 2 includes multiple pieces that work together to seal a corner 27 of the opening 20. The seal 2 has edge seals 35 for spanning the transverse surface 19 of the opening 20. Each edge seal 35 has a mounting flange 34 that is a flange adapted for being on the outside of the opening 20. The edge seals 35 also have an inner flange 38 that is adapted for being on the interior side of the opening 20. A bridge 36 connects the mounting flange 34 to the inner flange 38. The bridge 36 is adapted to span the transverse surfaces 19. This may be a fixed distance such as that of the bridge 36 shown in FIGS. 5 and 6, or can be of the type disclosed in U.S. Pat. No. 7,614,767 in which the bridge 36 is adjustable. A wiper seal 40 extends from the bridge 36 of each edge seal 35 toward one of the second sidewalls 24 of the slide out room 11, or toward the ceiling wall 22. The wiper seal 40 is a resilient material typically having a lower durometer than the mounting flange 34. The wiper seal 40 is typically integrally molded with the mounting flange 34, bridge 36, and inner flange 38 by a coextrusion process. The edge seals 35 are made of a sufficiently resilient material such as thermoplastic elastomer. The wiper seal 40 has a general planar section and is cantilevered from the bridge 36 so that a distal end that is maintained in resilient contact with the second sidewall 24 and is flexed against the second sidewall 24 or ceiling wall 22 to maintain an effective seal at all times during the extension or retraction of the slide out room 11. As can be seen in FIG. 4, the edge seals 35 differ from each other slightly. A horizontal edge seal 35' is located along the upper most edges 23, 25 of the opening 20 and has a single wiper seal 40 extending from its bridge 36. A vertical edge seal 35" has two wiper seals 40 extending from its bridge 36. When the horizontal edge seal 35' and vertical edge seal 35" are installed as shown in FIG. 4, the ends are cut squarely as shown in FIG. 4A.

The edge seals 35' and 35" are adapted for being installed onto the opening 20 by first placing either edge seal 35', 35" so that it straddles one of the transverse surfaces 19. For example, the vertical edge seal 35" is placed along a vertical transverse surface 19 so that the mounting flange 34 is on the outside of the sidewall 18 adjacent to the outer edge 23 and the inner flange 38 is adjacent to the inner edge 25. Next, the horizontal edge seal 35' is placed as shown in FIG. 4 so that it also straddles the horizontal transverse surface 19. The wiper seal 40 of the horizontal seal 35' is placed so that it is between the wiper seals 40 of the vertical edge seal 35". The mounting portions 34 and inner flanges 38 of the edge seals 35', 35" are held in place with a strip of adhesive tape 42 having adhesive on both sides that holds the mounting portions 34 and flanges 38 in place with respect to their corresponding outer and inner edges 23, 25. If additional securing of the mounting flange 34 is needed a mechanical fastener such as a screw 43 may be driven through the mounting flange 34 as shown in FIGS. 5 and 6.

The edge seals 35 have L-shaped tabs 56 that extend away from the mounting flange 34 opposite the sidewall 18 of the RV 6 that the edge seals 35 straddle. The tabs 56 on the edge seals 35 point inwardly toward each other to form a groove 60 as shown in FIGS. 5 and 6. The tabs 56 on the mounting flange 34 of the edge seal 35 may also point outwardly away from each other to form a tongue 62 as shown in FIG. 8. Typically the inwardly pointing tabs 56 shown in FIGS. 5, 6 and 4A are used for ease of installation.

In addition to the edge seals 35, the seal 2 further includes a corner piece 44 having legs 46 that are continuously joined to form a corner. Each leg 46 has a constant cross sectional shape along its entire length. The legs 46 are straight segments of bulb seal 49 with each having a mounting portion 47 and a bulb portion 48. The bulb portion 48 of each leg 46 on the corner piece 44 is hollow throughout its length and is integrally attached to the mounting portion 47. The legs 46 are formed from a coextrusion process that uses a lower durometer material for the bulb portion 48. Each bulb seal leg 46 is mitered at a forty-five degree angle and fused to an adjacent leg 46 to form a ninety degree corner 50. The bulb portions 48 and the mounting portions 47 of both joined legs 46 are fused continuously so as to be impervious throughout the entire joined corner 50. The bulb portions 48 where they meet at the joined corner 50 are hollow through the corner. This is done so that the bulb portion 48 is still flexible and will deform as the rest of the hollow bulb portion 48 that is not immediately adjacent the corner 50. The mounting portion 47 of the legs 46 each have L-shaped tabs 52 extending along the length the leg 46. As shown in FIGS. 5 and 7, the tabs 52 point outwardly away from each other to form a tongue 53. The tongue 53 of the corner piece 44 can be seen in exploded view FIG. 4A. Another embodiment of the corner piece 44 is shown in the sectional view of FIG. 8. In this embodiment, the tabs 52 point inwardly toward each other to form a groove 54. The legs 46 of the corner piece 44 being formed so the tabs 52 form a groove 54 as shown in FIG. 8, or the legs 46 being formed so the tabs 52 form a tongue 53 as shown in FIG. 7 function in substantially similar manner. The function of either embodiment of the corner piece 44 is to provide a tongue and groove connection between the corner piece 44 and mounting flange 34, which piece carries the tongue or groove does alter the ability of the corner piece to be secured to the edge seals 35', 35". FIG. 8 shows the tongue 62 being on the mounting flange 34 of the edge seal 35, and FIG. 5 shows the tongue 53 being on the mounting portion 47 of a leg 46 of a corner piece 44.

To install the seal 2 onto an RV 6 about the opening 20, adhesive tape 42 is applied adjacent to edges 23, 25 of the opening 20. It is also contemplated that the edge seals 35', 35" could include adhesive tape applied to the mounting flange 34 and inner flanges 38 of the seals 35', 35". One of the edge seals 35' or 35" is first placed so that it spans a corresponding transverse surface 19, and the bridge of the edge seal 35', 35" rests on its corresponding transverse surface 19. This aligns the edge seal 35 being installed so that the wiper seals 40 contained thereon are extending into the opening 20 a uniform distance from the transverse surface. This ensures uniform contact with a wall 22, 24 of the slide out room 11. Both of the edge seals 35', 35" are cut at the ends as shown in FIG. 4A. The edge seals 35', 35" having a groove 60 are shown in FIG. 4A. In this case, the horizontal edge seal 35' has a lower tab 56' partially cut away adjacent to its end. The outer tab 56" of the vertical edge seal 35" is partially notched to allow an upper tab 56' on the horizontal edge seal 35' to overlap with the removed portion of the outer tab 56". The edge seals 35', 35" are installed in a configuration so that the wiper seal 40 on the horizontal edge seal 35' is between the two wiper seals 40 of the vertical edge seal 35". This is to maximize sealing of the wiper seals 40 against the slide out room 11. The overlapping nature can be seen in FIG. 4. With the edge seals 35', 35" in place, the corner pieces 44 are placed over the installed edge seals 35', 35" adjacent to the corner 27 of the opening and over the mounting flanges 34 of the two adjacent edge seals 35', 35". With the corner piece 44 over the mounting flanges 34 the tongue 62, 53 on either the edge seal 35 or corner piece 44 is tucked or pressed into the groove of the other mating part. FIG. 7 shows the tongue 53 of the corner piece being tucked into the groove 60 of an edge seal 35. An installation knife 84 with a rounded edge may be use to tuck the tongue 53 into the groove 60 as shown in FIG. 7. The installation knife 84 is typically a thin elongate tool with a rounded edge so that it will not cut the seal during the installation process. The tongue 53 is designed to be slightly wider than the groove 60 to provide an interference fit to minimize undesired sliding. The tongue 53 is also designed using two L-shaped tabs 52 as opposed to a solid tongue because doing so allows greater resiliency to bias the tabs 52 against the tabs 56 of the groove 60 and this greater resilience can be used to accommodate tolerances in the mating parts. The geometry of the corner piece having substantially perpendicular legs 46 prevents substantial movement of the corner piece from its installed location. The process of tucking the tongue 53 as describe above may be done oppositely if the tongue is on the mounting flange 34 of the edge seals 35. This configuration is shown in FIG. 8. In this case, the tongue 62 is tucked pressed into the groove 54 of the corner piece 44. With the corner piece installed straight bulb seals 49 are fitted into each corner piece with a mating connector tube 70. The connector tube 70 is a deformable hollow tube that joins adjacent bulb seal 49 to a leg 46 of a corner piece 44, or can be used to join multiple sections of bulb seal 49. The straight bulb seals 49 have the same cross sectional shape as the corner pieces 44 to be compatible with the mounting flanges of the edge seals 35. If the corner pieces 44 have a groove 60 then the corner pieces 44 and straight bulb seals 49 must all have tongues 53 because the edge seals 35 have uniform cross sectional shapes along their entire length. With the tongue and groove connection between the corner piece 44 and mounting flanges 34 of adjacent edge seals 35', 35" water is prevented from dripping through an open corner due to the one piece design of the corner piece 44. This is particularly true when the slide out room 11 is in its retracted position shown in FIG. 2 because the bulb portion 48 will be deformed between the sidewall 18 of the RV and the outer peripheral flange 30. The tongue and groove connection between the corner piece 44 and mounting flange 34 create a circuitous path through which water must travel that prevents water incursion.

The invention is not limited to the details given above, but may be modified within the scope of the following claims.

What is claimed is:

1. A resilient seal for use in combination with a mobile living quarters having a slide out room defining an interior space, said mobile living quarters comprising a first sidewall having an interior and exterior side, said first sidewall having an opening therethrough which said slide out room is movable between a retracted and extended position relative to said first sidewall, said opening having a transverse surface defining said opening and spanning between said interior and exterior sides of said sidewall, said opening including at least one corner, said slide out room including a second sidewall spaced from said first sidewall and an end wall defining said interior space, said end wall including a peripheral flange overlapping said first sidewall when said slide out room is in its said retracted position, said seal comprising:

a first edge seal having an inner flange, a mounting flange opposite said inner flange and a bridge for joining said inner and mounting flanges, a wiper seal cantilevered from said bridge extending into said opening, said inner and mounting flanges adapted for straddling said sidewall when said bridge is adjacent to said transverse surface;

a second edge seal having an inner flange, a mounting flange opposite said inner flange and a bridge for joining said inner and mounting flanges, a wiper seal cantilevered from said bridge extending into said opening, said inner and mounting flanges adapted for straddling said sidewall when said bridge is adjacent to said transverse surface, said first and second edge seals being oriented substantially perpendicular to each other; and a corner piece having a first leg and second leg being substantially perpendicular to each other and forming a fused corner, said corner piece having a bulb seal on each leg adapted for sealing against said peripheral flange, a tongue connector extending from each said leg of said corner piece for securing said corner piece to said edge seals.

2. A resilient seal as claimed in claim 1, wherein said tongue connector includes a pair of L-shaped tabs, and said edge seals include a groove including a pair of L-shaped tabs.

3. A resilient seal for sealing an opening in a sidewall having a transverse surface extending between opposite sides of said sidewall, said opening having at least one corner, said opening adapted for accommodating a slide out room, said seal comprising:

a first edge seal having an inner flange, a mounting flange opposite said inner flange and a bridge for joining said inner and mounting flanges, a wiper seal cantilevered from said bridge, said inner and mounting flanges adapted for straddling said sidewall when said bridge is adjacent to said transverse surface;

a second edge seal having an inner flange, a mounting flange opposite said inner flange and a bridge for joining said inner and mounting flanges, a wiper seal cantilevered from said bridge, said inner and mounting flanges adapted for straddling said sidewall when said bridge is adjacent to said transverse surface, said first and second edge seals being oriented substantially perpendicular to each other; and a corner piece having a first leg and a second leg being substantially perpendicular to each other and forming a fused corner, said corner piece having a bulb seal on each leg adapted for sealing against said peripheral flange, a tongue connector extending from each said leg of said corner piece for securing said corner piece to said edge seals.

4. A resilient seal as claimed in claim 3, wherein said tongue connector includes a pair of L-shaped tabs, and said edge seals include a groove includes including a pair of L-shaped tabs.

5. A resilient seal for use in combination with a mobile living quarters having a slide out room defining an interior space, said mobile living quarters comprising a first sidewall having an interior and exterior side, said first sidewall having an opening therethrough which said slide out room is movable between a retracted and extended position relative to said first sidewall, said opening having a transverse surface defining said opening and spanning between said interior and exterior sides of said sidewall, said opening including at least one corner, said slide out room including a second sidewall spaced from said first sidewall and an end wall defining said interior space, said end wall including a peripheral flange overlapping said first sidewall when said slide out room is in its said retracted position, said seal comprising:

a first edge seal having an inner flange, a mounting flange opposite said inner flange and a bridge for joining said inner and mounting flanges, a wiper seal cantilevered from said bridge extending into said opening, said inner and mounting flanges adapted for straddling said sidewall when said bridge is adjacent to said transverse surface;

a second edge seal having an inner flange, a mounting flange opposite said inner flange and a bridge for joining said inner and mounting flanges, a wiper seal cantilevered from said bridge extending into said opening, said inner and mounting flanges adapted for straddling said sidewall when said bridge is adjacent to said transverse surface, said first and second edge seals being oriented substantially perpendicular to each other; and a corner piece having a first leg and second leg being substantially perpendicular to each other and forming a fused corner, said corner piece having a bulb seal on each leg adapted for sealing against said peripheral flange, a tongue connector extending from one of said corner piece or said edge seals for securing said corner piece to said edge seals.

6. A resilient seal as claimed in claim 5, wherein said tongue connector extends from said corner piece and is adapted for being received in a groove on said edge seals.

7. A resilient seal as claimed in claim 5, wherein said tongue connector extends from said edge seals and is adapted for being received in a groove on said corner piece.

* * * * *